United States Patent
Lim

(10) Patent No.: US 7,436,426 B2
(45) Date of Patent: Oct. 14, 2008

(54) LASER SCANNING APPARATUS AND IMAGE FORMING DEVICE HAVING THE SAME

(75) Inventor: Kyung-min Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 11/675,330

(22) Filed: Feb. 15, 2007

(65) Prior Publication Data
US 2008/0025747 A1    Jan. 31, 2008

(30) Foreign Application Priority Data
Jul. 28, 2006    (KR) .................... 10-2006-0071715

(51) Int. Cl.
*G02B 7/182* (2006.01)
(52) U.S. Cl. ..................... 347/263; 399/99; 347/152
(58) Field of Classification Search ............. 347/152, 347/263, 242, 245, 253; 399/98, 99
See application file for complete search history.

(56) References Cited

U.S. PATENT DOCUMENTS

| 2005/0012973 A1* | 1/2005 | Sowa et al. ............... 359/198 |
| 2007/0024943 A1* | 2/2007 | Namba .................... 359/216 |
| 2008/0107444 A1* | 5/2008 | Hashimoto ................ 399/99 |

FOREIGN PATENT DOCUMENTS

JP     2005-329622     12/2005

* cited by examiner

*Primary Examiner*—Huan H Tran
(74) *Attorney, Agent, or Firm*—Stein, McEwen & Bui, LLP

(57) ABSTRACT

A laser scanning apparatus capable of preventing a secondary contamination of light transmitting windows and an image forming device having the same include a light emitting unit to emit light, a cover connected to a laser scanning apparatus body, and having at least one light transmitting window through which light passes, a cleaning member reciprocally disposed on the cover to clean the light transmitting window when on a cleaning path, and a guide unit to guide a movement of the cleaning member, so that the cleaning path is other than a returning path of the cleaning member and have different up and down periods from each other.

35 Claims, 8 Drawing Sheets

(a)

(b)

LASER SCANNING APPARATUS AND IMAGE FORMING DEVICE HAVING THE SAME

CROSS-REFERENCE TO RELATED APPLICATION

This application claims the benefit of Korean Application No. 2006-71715, filed Jul. 28, 2006 in the Korean Intellectual Property Office, the disclosure of which is incorporated herein by reference.

BACKGROUND OF THE INVENTION

1. Field of the Invention

Aspects of the present invention relate to a laser scanning apparatus and image forming device having the same, and more particularly, to a cleaning unit for a laser scanning apparatus and an image forming device having the same.

2. Description of the Related Art

Generally, an electrophotography image forming device, such as a laser printer, a copier, a scanner, or a multi-function machine which combines functions of the above apparatuses into a single apparatus, includes a laser scanning apparatus. An example of such a laser scanning apparatus is illustrated in FIG. 1.

The laser scanning apparatus illustrated in FIGS. 1 and 2 is disclosed in Japanese patent publication No. 2005-329622, and includes a body 10 in which a rotary polygon mirror 11 is disposed to deflectively scan lights emitted from a light source (not shown) in predetermined directions. The body 10 has openings 21 through which the lights scanned from the body 10 pass to the outside. The lights which pass through the openings 21 are scanned onto a photoconductive medium to form a desired electrostatic latent image thereon.

In addition, the laser scanning apparatus illustrated in FIGS. 1 and 2 includes light transmitting windows 20 to block external foreign substances, such as dust, from flowing into the openings 21 without interfering with light paths which pass through the openings 21. Shutter members 30 selectively open the light transmitting windows 20. Cleaning members 40 disposed on the shutter members 30 clean the light transmitting windows 20.

The shutter members 30 move between blocking and opening positions. The shutter members 30 block and open the light paths which pass through the openings 21 by a driving unit 31 having a driving motor 31a, and are made of an elastic material.

According to the constructions as described above, the cleaning members 40 move in connection with the position movement of the shutter members 30 such that the cleaning members 40 come in close contact with surfaces of the light transmitting windows 20, to clean dirt or dust from the surfaces of the light transmitting windows 20. However, in the conventional laser scanning apparatus, a problem may occur, in that the light transmitting windows 20 are re-contaminated by the dirt previously cleaned off the windows 20, since the cleaning members 40 move in connection with the shutter members 30 such that the cleaning members 40 come in close contact with the surfaces of the light transmitting windows 20 both when the cleaning members move along a cleaning path and a returning path. That is, since a cleaning path and a returning path of the cleaning member 40 are the same, the secondary contamination of the light transmitting windows 20 as described above occurs.

SUMMARY OF THE INVENTION

An aspect of the present invention provides a laser scanning apparatus configured so that a cleaning path and a returning path of a cleaning member have different up and down periods from each other, respectively, thereby ensuring the cleaning member not to be in contact with light transmitting windows when moving along the return path, and thus preventing a secondary contamination of the light transmitting windows, and an image forming device having the same.

Additional aspects and/or advantages of the invention will be set forth in part in the description which follows and, in part, will be obvious from the description, or may be learned by practice of the invention.

According to an aspect of the present invention, a laser scanning apparatus includes a light emitting unit to emit a light, a cover connected to a laser scanning apparatus body, and having at least one light transmitting window through which the light passes, a cleaning member reciprocally disposed on the cover to clean the light transmitting window when on a cleaning path, and a guide unit to guide a movement of the cleaning member so that the cleaning path is other than a returning path of the cleaning member and have different up and down periods from each other.

According to an aspect, the guide unit may include at least one pair of guide protrusions formed on both sides of the cleaning member, and at least one pair of guide rails formed on both sides of the cover to accommodate the guide protrusions. Each of the guide rails may have a downwardly inclined rail part to guide the cleaning member along the cleaning path and an upwardly inclined rail part to guide the cleaning member along the returning path.

According to an aspect, each of the guide rails may have a first connecting rail part and a second connecting rail part to connect the downwardly inclined rail part to the upwardly inclined rail part in a loop.

According to an aspect, the guide unit may further include a pressing unit to push down the cleaning member, so that the cleaning member moves along the downwardly inclined rail part at a starting position of the cleaning path, and a lifting unit to lift up the cleaning member, so that the cleaning member moves from an ending position of the cleaning path to a starting position of the returning path.

According to an aspect, the pressing unit may include at least one pair of pressing protrusions inclined at a predetermined angle and formed on both sides of the cleaning member, and at least one pair of pressing grooves formed on both sides of the cover to accommodate the pressing protrusions, and having inclined parts disposed at an inclined angle corresponding to the predetermined angle of the pressing protrusions.

According to an aspect, the lifting unit may include first and second inclined protrusions having a predetermined slant and which are respectively formed on the cleaning member and the cover to contact each other when the cleaning member moves along the cleaning path.

Also, according to an aspect, the laser scanning apparatus may further include a driving part to reciprocate the cleaning member.

According to an aspect, the cleaning member may include a plate, and at least one brush attached to an undersurface of the plate.

According to an aspect, at least one collecting rib may be disposed on the cover to remove particles off the at least one brush and to collect the particles.

According to an aspect, the collecting rib includes three collecting sub-ribs having different heights from one another.

According to an aspect, at least one slit may be formed in the plate to selectively open a light path.

According to an aspect, the at least one light transmitting window may include four light transmitting windows on the cover through which four respective colors of light pass through, and the cleaning member may include four brushes to clean the four light transmitting windows.

According to another aspect, the guide unit may include four pairs of guide protrusions, each pair of which are formed on both sides of the cleaning member, and four pairs of guide rails, each pair of which are formed on both sides of the cover to accommodate each pair of the guide protrusions. Each of the guide rails may have a downwardly inclined rail part to guide the cleaning member along the cleaning path and an upwardly inclined rail part to guide the cleaning member along the returning path.

Also, according to another aspect, the guide unit may further include a pressing unit to push down the cleaning member, so that the cleaning member moves along the downwardly inclined rail parts at a starting position of the cleaning path, and a lifting unit to lift up the cleaning member, so that the cleaning member moves from an ending position of the cleaning path to a starting position of the returning path.

Also, according to another aspect, four slits may be formed in the cleaning member to selectively open path for light beams emitted from the four corresponding transmitting windows.

According to another aspect, four dirt collecting parts may be disposed adjacent to the four transmitting windows to remove particles off the four brushes and to collect the particles.

According to another aspect, each of the four dirt collecting parts may include three collecting sub-ribs having different heights from one another.

According to still another aspect of the present invention, an image forming device includes a photoconductive medium and a laser scanning apparatus to form an electrostatic latent image on the photoconductive medium by emitting a light beam. The laser scanning apparatus includes a cover connected to a laser scanning apparatus body, and having at least one light transmitting window through which the light beam passes to the photoconductive medium, a cleaning member reciprocally disposed on the cover to clean the light transmitting window when on a cleaning path, and a guide unit to guide a movement of the cleaning member, so that the cleaning path is other than a returning path of the cleaning member and have different up and down periods from each other.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
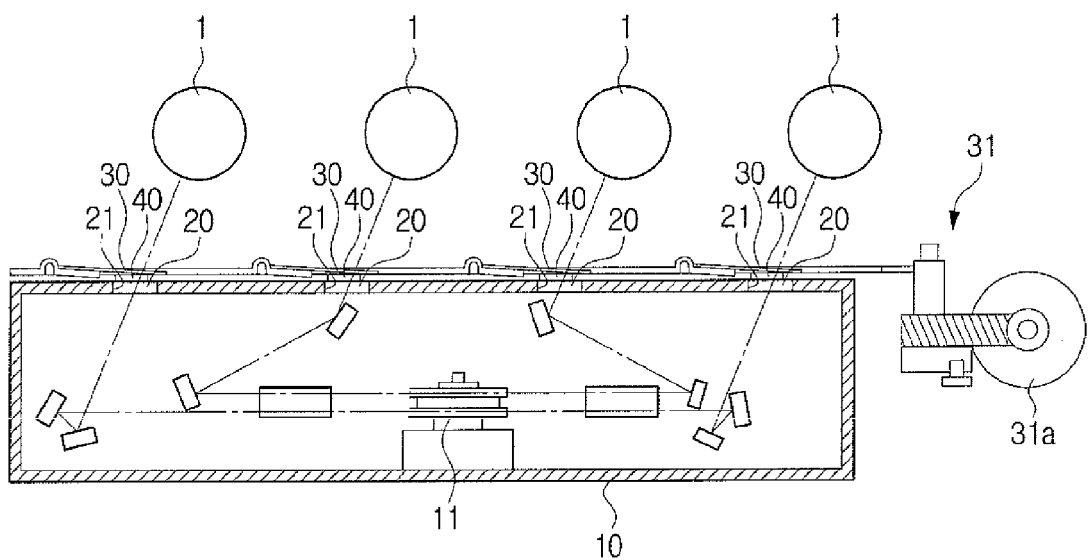
FIG. 1 is a cross sectional view schematically illustrating a general laser scanning apparatus of an image forming device.
Figure 2:
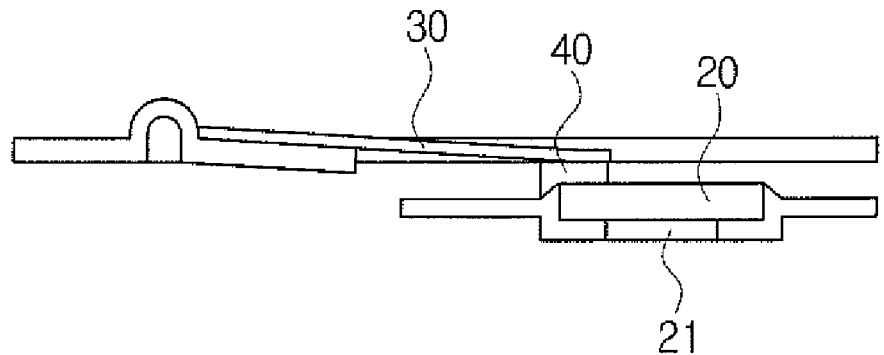
FIG. 2 is a cross sectional view illustrating a cleaning operation of light transmitting windows 20 of the laser scanning apparatus of FIG. 1.
Figure 2:
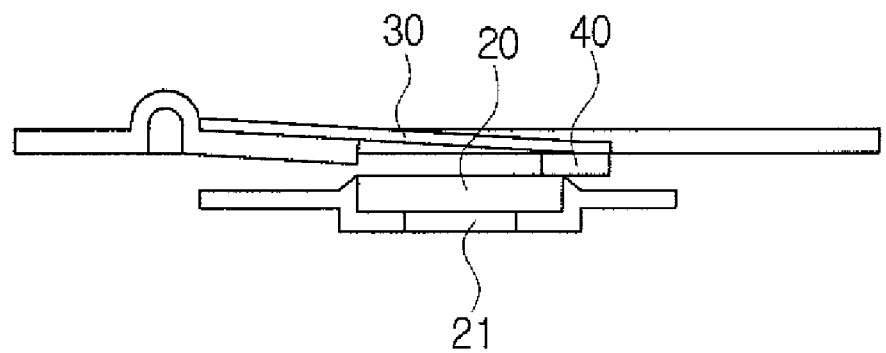

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The matters defined in the description, such as a detailed construction and elements thereof, are provided to assist in a comprehensive understanding of the invention. Thus, it is apparent that the present invention may be carried out without those defined matters. Also, well-known functions or constructions are omitted to provide a clear and concise description.

Figure 3:
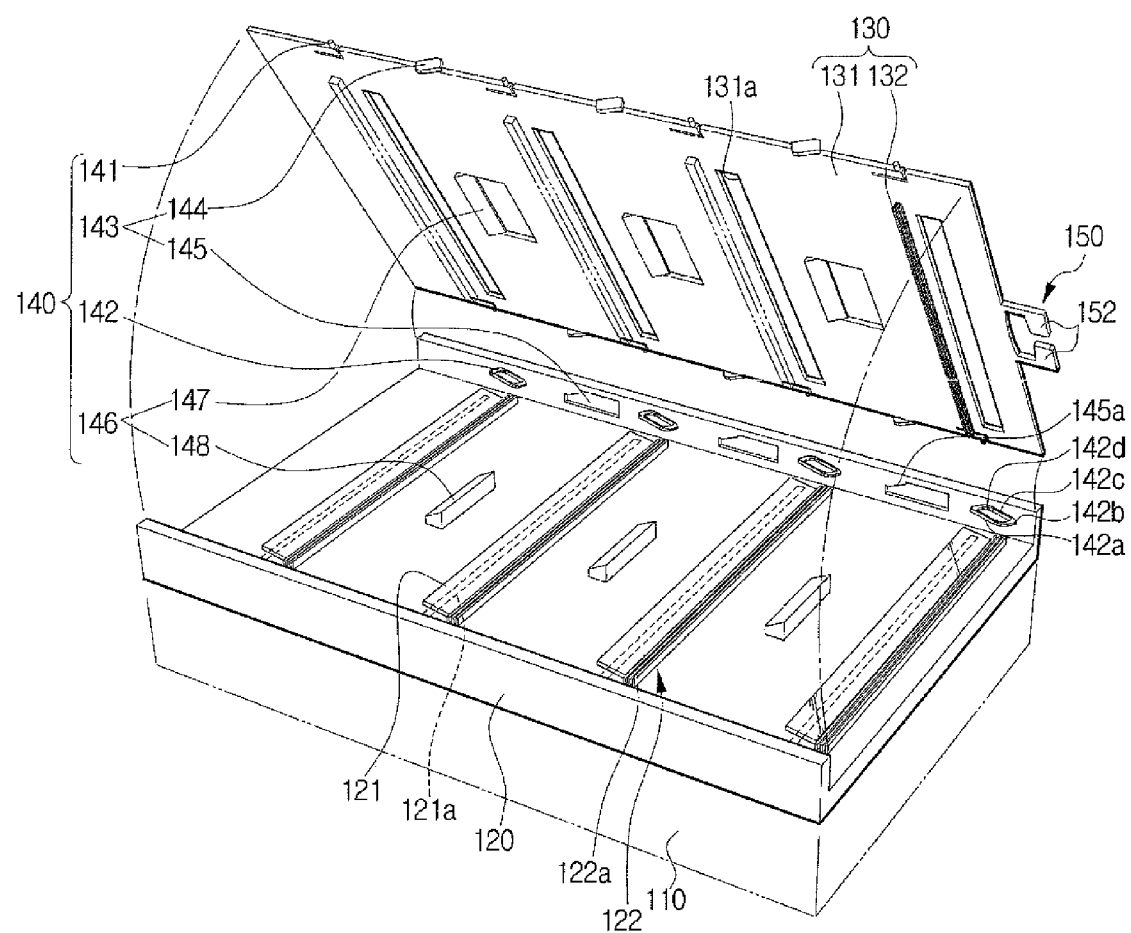
FIG. 3 is an exploded perspective view schematically illustrating a laser scanning apparatus of an image forming device according to an embodiment of the present invention.

As illustrated in FIG. 3, a laser scanning apparatus of an image forming device according to an embodiment of the present invention includes a laser scanning apparatus body 110, a cover 120, a cleaning member 130, and a guide unit 140. The laser scanning apparatus body 110 has a rotary polygon mirror (not illustrated) mounted therein to deflectively scan lights emitted from a light source (not shown) toward predetermined paths. To realize images of four colors, for example, yellow, magenta, cyan and black, the rotary polygon mirror deflectively scans four lights. Since technical constructions of the rotary polygon mirror and the light source are the same as those of the rotary polygon mirror and the light source known in the art, detailed descriptions thereof will be omitted for clarity and conciseness.

The cover 120 includes openings 121a to transmit light beams L (see FIG. 5B), and light transmitting windows 121 disposed to cover the openings 121a. The light transmitting windows 121 are inclined at a predetermined angle in order to guide moving directions of the light beams L.

Also, the light transmitting windows 121 are made of a material capable of transmitting the light beams L, in order to prevent foreign substances, such as dust or dirt from flowing into the openings 121a without interfering with the light paths of the light beams L. According to an embodiment of the present invention, the light transmitting windows 121 are illustrated and explained as made of a general glass material. However, it is understood that the light transmitting windows 121 may also be made of other types of materials, such as plastic, a glass-plastic combination, etc.

The cleaning member 130 is reciprocally disposed on the cover 120, and cleans the light transmitting windows 121. The shown cleaning member 130 includes a plate 131 and brushes 132. However, it is understood that the cleaning member 130 can be otherwise constructed, such as using a cloth.

The cover 120 supports the plate 131 at both ends thereof, so that the plate 131 faces an upper surface of the cover 120. The plate 131 is shuttled or reciprocated (right and left in FIG. 3) in two different up and down periods from each other. Slits 131a are formed in the plate 131, which selectively open paths of the light beams L passing through the light transmitting windows 121.

According to an aspect of the invention, the plate 131 has both a cleaning function to clean foreign substances as the cleaning member 130, and a shutter function to selectively open the paths of the light beams L through the light transmitting windows 121. As shown, the number of slits 131*a* is set to correspond to that of the light transmitting windows 121. An embodiment of the present invention includes four light transmitting windows 121 through which the light beams L of four colors reflected from the rotary polygon mirror are transmitted, respectively, and four slits 131*a* corresponding thereto are illustrated. However, it is understood that other numbers can be used in other aspects, and that the ratio of slits to windows need not be 1:1.

The brushes 132 are preferably, but not necessarily, installed on an undersurface of the plate 131, in order to face the corresponding light transmitting windows 121. Thus, with a reciprocating movement of the plate 131, the brushes 132 clean the corresponding light transmitting windows 121. As illustrated in FIGS. 7B and 8B, the brushes 132 clean dust or dirt from the light transmitting windows 121, which are inclined at predetermined angles, by moving along the light transmitting windows 121. Preferably, but not necessarily, the brushes 132 are made up of four brushes to clean the four corresponding light transmitting windows 121.

Although the brushes 131 according to an embodiment of the present invention are general fur brushes, the present invention is not limited to that. For instance, the brushes 132 can instead be dustcloth brushes, or can also be many other types of brushes.

Dirt collecting parts 122 are disposed on the cover 120 to scrape dust or dirt off the brushes 132 and collect the scraped-off dirt. Each of the dirt collecting parts 122 preferably, but not necessarily, has at least one collecting rib 122*a*. However, it is understood that the dirt collecting parts 122 do not require a collecting rib 122*a*, and may instead use other components to collect scraped-off dirt, dust, etc. As illustrated in FIGS. 5B and 8B, the dirt collecting parts 122 are embodied in four dirt collecting parts, which are disposed in positions for separating the cleaned dirt from the brushes 132 after the brushes 132 clean the light transmitting windows 121, that is, in the vicinity of the corresponding light transmitting windows 121.

Each of the dirt collecting parts 122 are configured so that three collecting sub-ribs 122*a* are disposed in the form of a staircase, wherein each step has a greater height from the previous step, in relation to the cover 120. With these constructions, the dirt collecting parts 122 can separate the dirt and other particles from the brushes 132, and at the same time, collect the separated dirt and other particles into spaces between the collecting ribs 122*a*.

Figure 4:
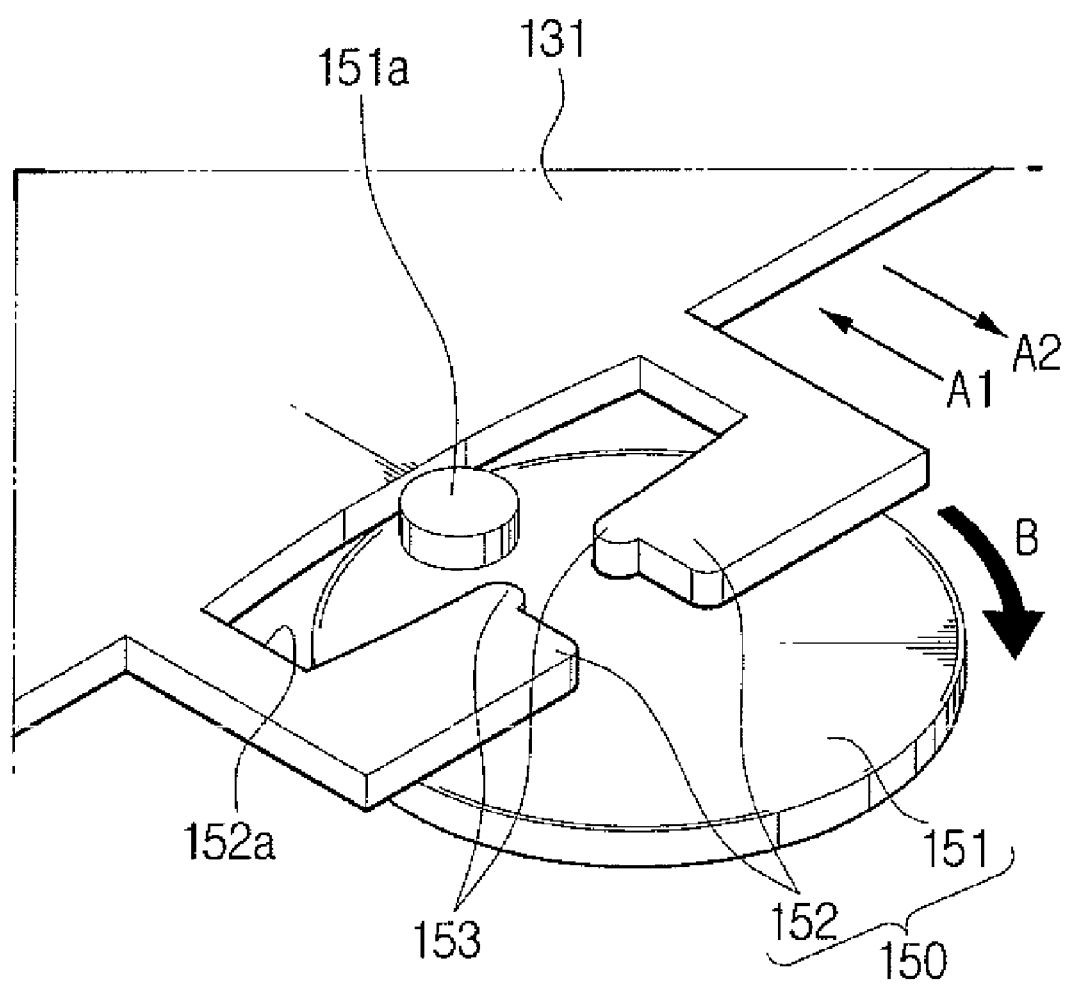
FIG. 4 is a perspective view schematically illustrating a driving part 150 of the laser scanning apparatus of FIG. 3.

The cleaning member 130 is reciprocated by the driving part 150. The driving part 150 includes a cam 151 having a cam protrusion 151*a*. The cam 151 and cam protrusion 151*a* preferably, but not necessarily, rotate in a direction of the arrow B (as shown in FIG. 4). A pair of interfering wings 152 form a cam hole 152*a* to accommodate the cam protrusion 151*a*, so that the cam protrusion 151*a* reciprocates the plate 131 in directions of arrows A1 and A2. However, it is understood that the cam 151 and cam protrusion 151*a* may also rotate in the direction opposite the arrow B.

The interfering wings 152 are formed to project from the plate 131. Also, although not illustrated, the cam 151 is preferably, but not necessarily, disposed to be supported by the cover 120 or by the laser scanning apparatus body 110. The interfering wings 152 are formed as hook protrusions 153 for preventing the cam protrusions 151*a* from escaping out of the cam hole 152*a*, respectively. While shown as having an opening between protrusions 153, it is understood that the protrusions 153 can instead be joined as one continuous side of the cam hole 152*a*.

On the other hand, although an embodiment of the present invention includes the driving part 150 having the cam 151, the present invention is not limited to that. That is, the driving part 150 can be embodied in any one of various driving means, which are configured to receive a driving force from a driving source, such as a driving motor, and to reciprocate the plate 131.

The guide unit 140 guides the movement of the cleaning member 130, so that a cleaning path and a returning path which the cleaning member 130 moves along have different up and down periods from each other. The guide unit 140 includes guide protrusions 141 formed on the cleaning member 130, and guide rails 142 formed on the cover 120 to accommodate the guide protrusions 141.

The guide protrusions 141 are formed to project from both sides of the cleaning member 130. Here, preferably, but not necessarily, the guide protrusions 141 are formed to be incised on and bent from both sides of the cleaning member 130, thereby allowing the guide protrusions 141 to be elastically supported on the plate 131.

The guide rails 142 are formed on both sides of the cover 120 to accommodate the guide protrusions 141. Each of the guide rails 142 has a downwardly inclined rail part 142*a* to guide the cleaning member 130 along the cleaning path and an upwardly inclined rail part 142*b* to guide the cleaning member 130 along the returning path. The guide rails 142 further include first and second connecting rail parts 142*c* and 142*d*, respectively, to connect the downwardly inclined rail part 142*a* and the upwardly inclined rail part 142*b*.

Figure 7A:
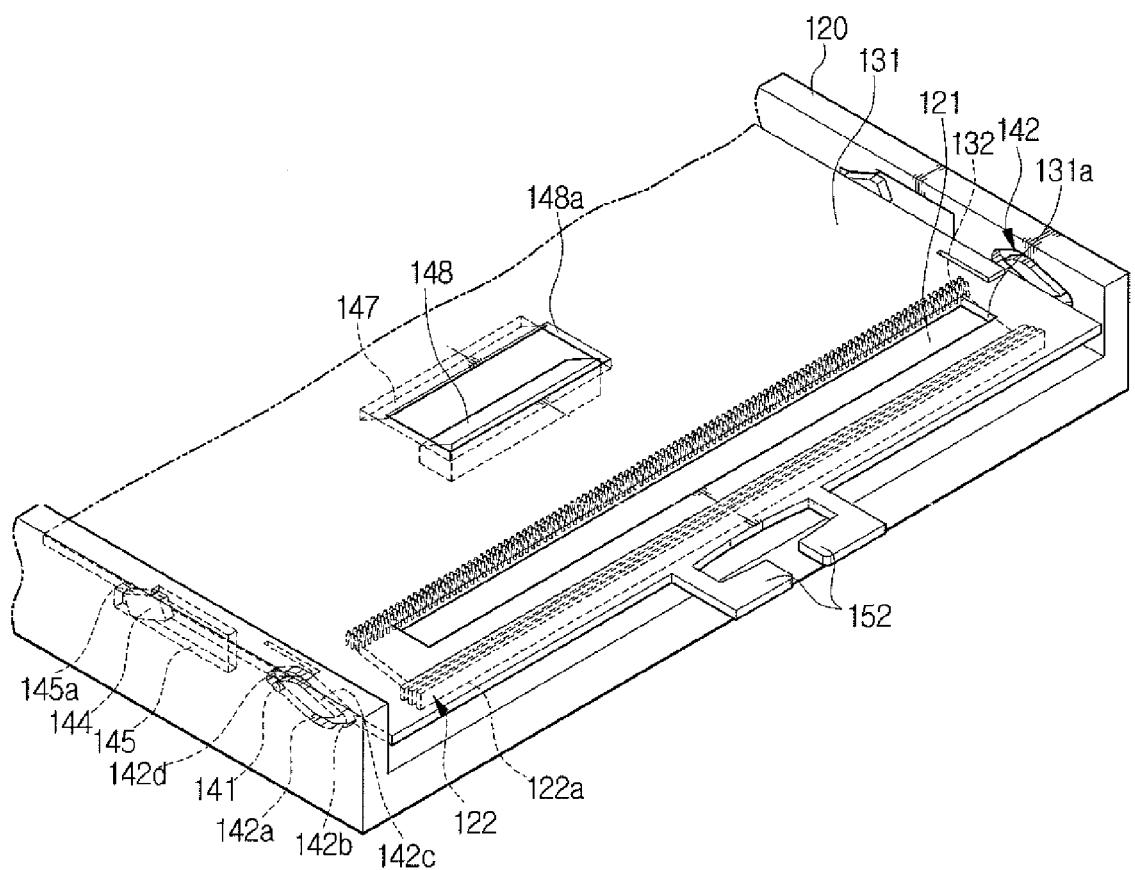
FIGS. 7A and 7B illustrate the guide protrusions 141 located at a starting position of a cleaning path.
Figure 7B:
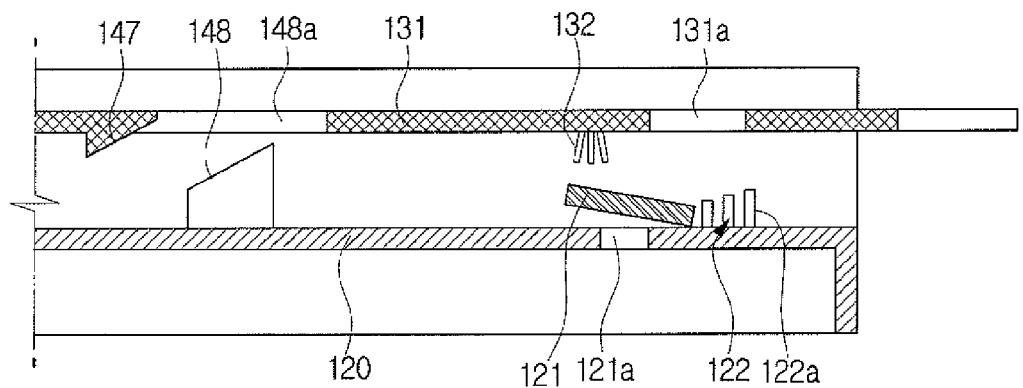

As illustrated in FIG. 7A, the downwardly inclined rail part 142*a* guides the brushes 132 along the cleaning path. The downwardly inclined rail part 142*a* preferably has an inclined angle corresponding to the predetermined inclined angle of the light transmitting windows 121. According to this design, the guide protrusions 142 move in a downward incline along the downwardly inclined rail part 142*a*, so that the brushes 132 can clean surfaces of the light transmitting windows 121, as illustrated in FIG. 7B.

Figure 8A:
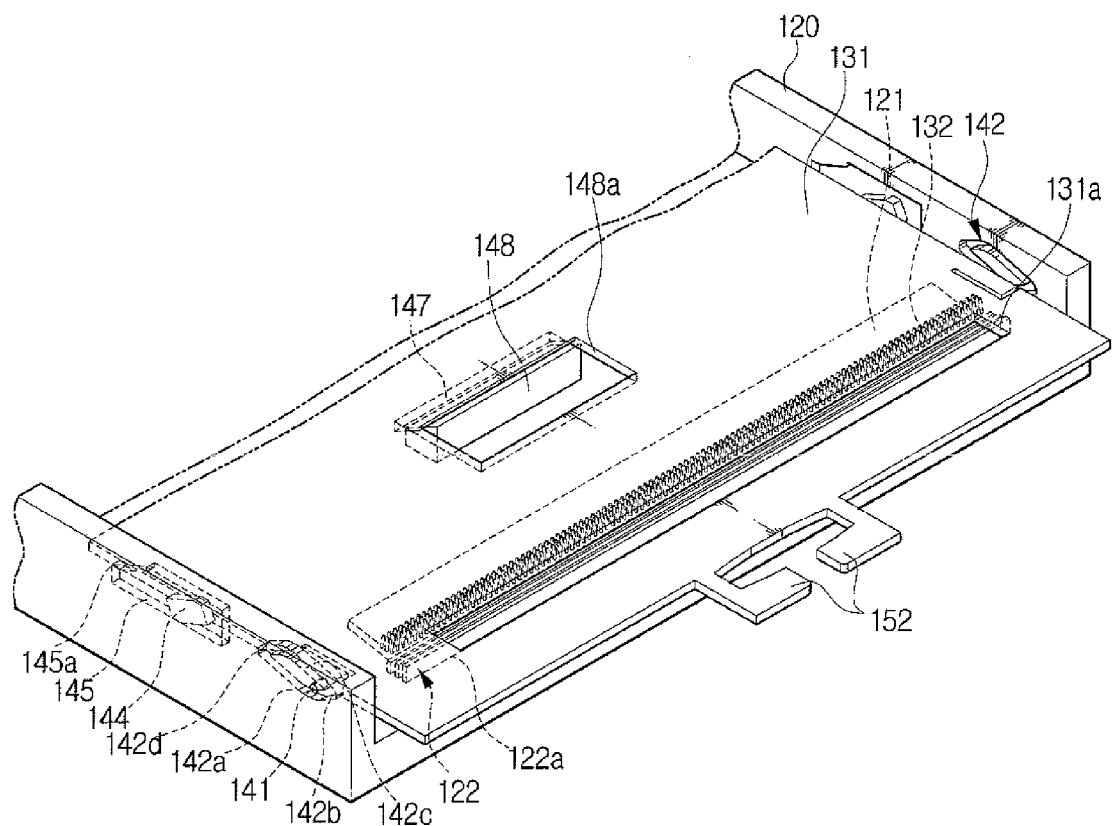
FIGS. 8A and 8B illustrate the guide protrusions 141 located at an ending position of the cleaning path.
Figure 8B:
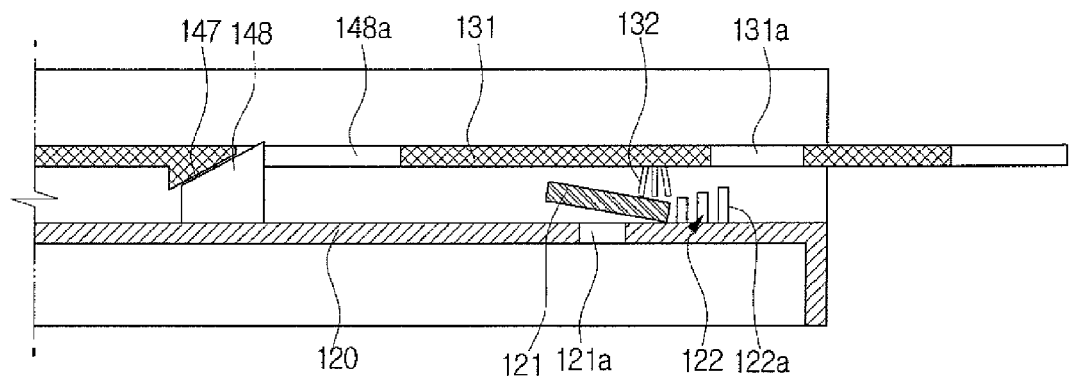

As illustrated in FIG. 8A, the upwardly inclined rail part 142*b* is connected with the downwardly inclined rail part 142*a*, and guides the brushes 132 onto the dirt collecting parts 122. The collecting ribs 122*a* are preferably, but not necessarily, formed as a staircase, wherein each step has a greater height than the previous step, and the angle of the steps corresponds to the slant of the upwardly inclined rail part 142*b*.

Figure 5A:
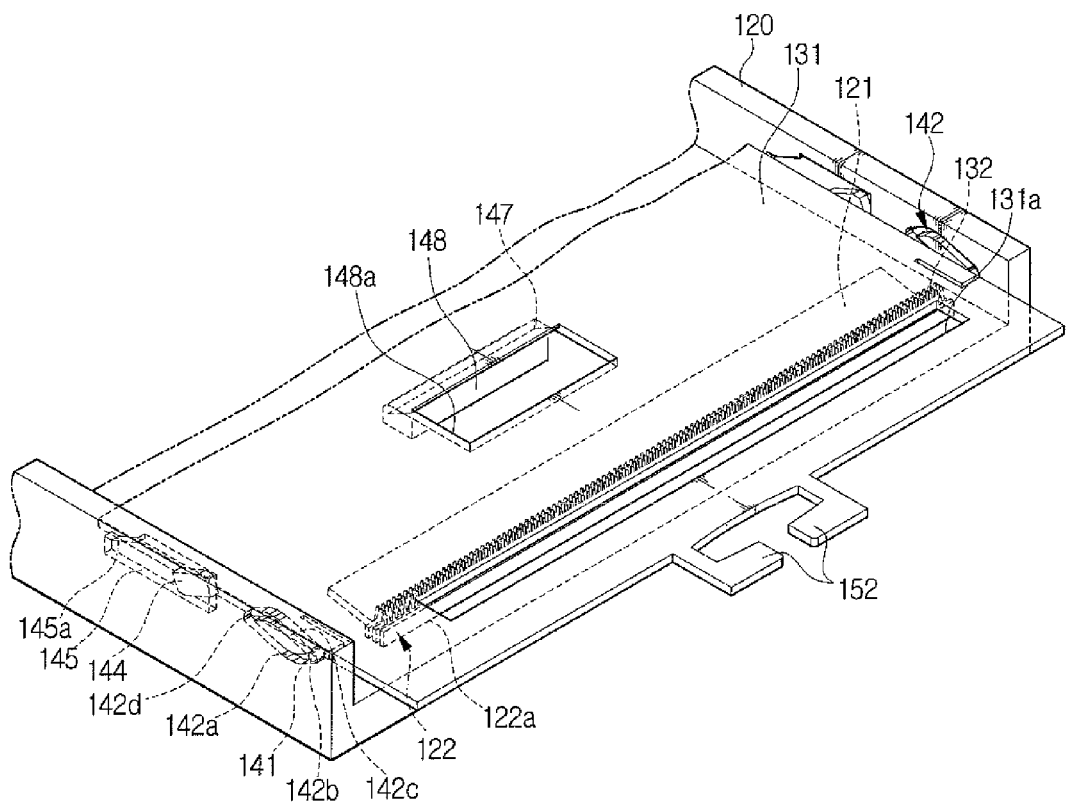
FIGS. 5A and 5B illustrate the guide protrusions 141 located at a starting position of a returning path.
Figure 5B:
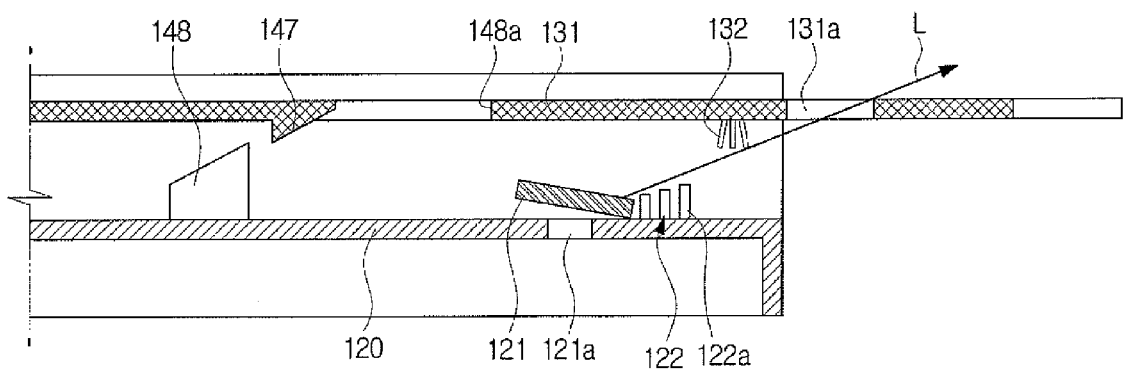
Figure 6A:
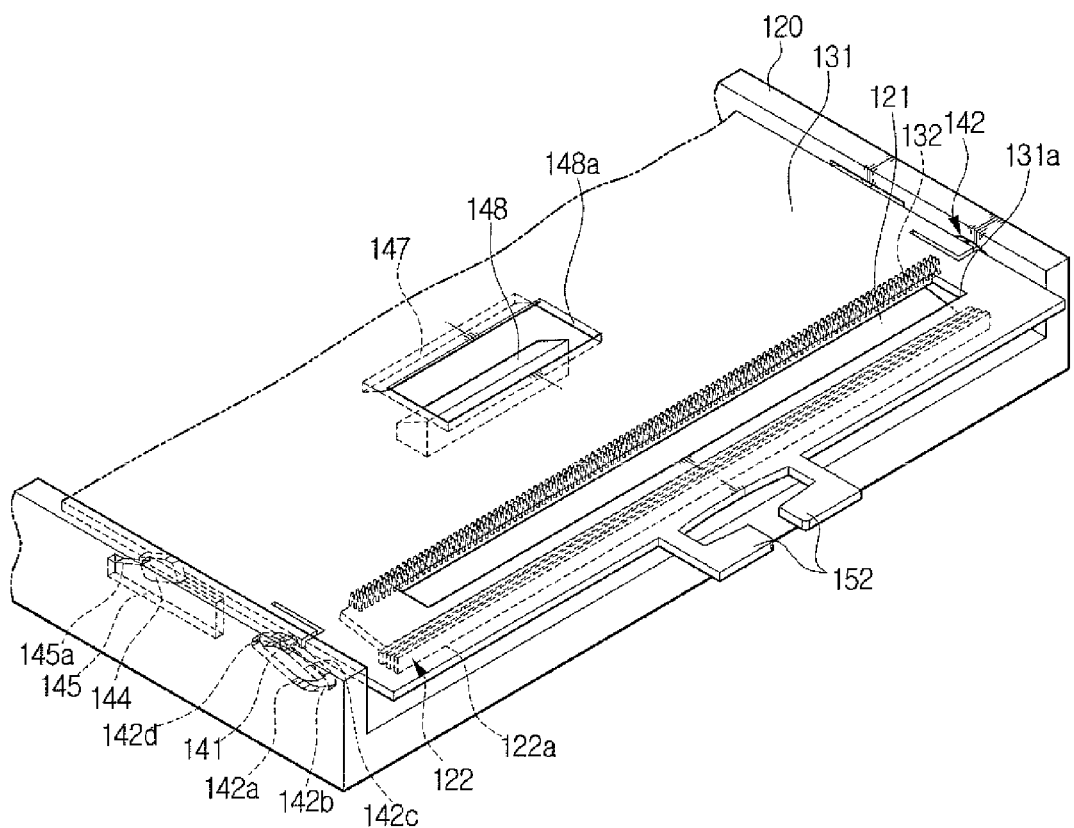
FIGS. 6A and 6B illustrate the guide protrusions 141 located at an ending position of the returning path.
Figure 6B:
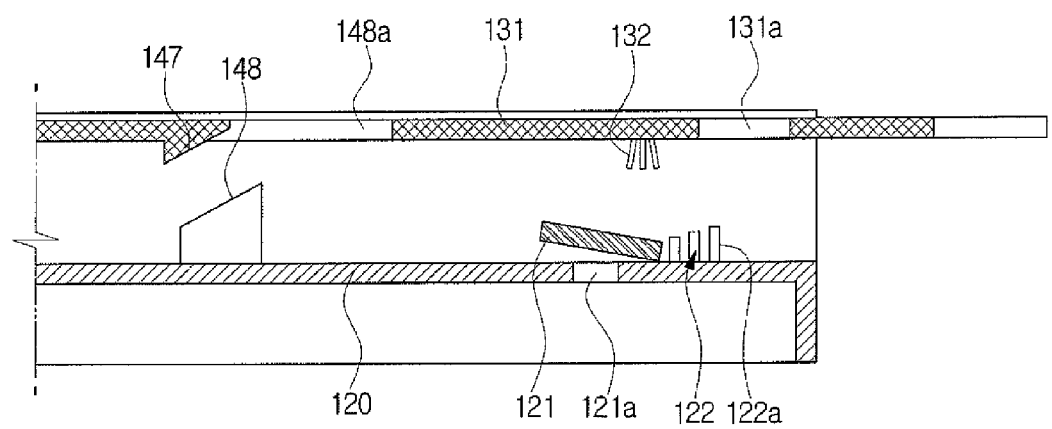

As illustrated in FIGS. 5A and 6A, the first and the second connecting rail parts 142*c* and 142*d* interconnect the downwardly inclined rail part 142*a* and the upwardly inclined rail part 142*b* in a loop. The first and the second connecting rail parts 142*c* and 142*d* are preferably formed to respectively incline upward and downward. However, the present invention is not limited to this design. That is, since there are phase differences in height even between an upper end and a lower end of the downwardly inclined rail part 142*a* and between an upper end and a lower end of the upwardly inclined rail part 142*b*, the first and the second connecting rail parts 142*c* and 142*d* can be configured to interconnect the downwardly inclined rail part 142*a* and the upwardly inclined rail part 142*b* in the form of a straight line. Furthermore, it is understood that the first and the second connecting rail parts 142*c* and 142*d* can be configured to interconnect the downwardly inclined rail part 142*a* and the upwardly inclined rail part 142*b* in forms other than a straight line as well.

Also, although the first and the second connecting rail parts 142*c* and 142*d* are illustrated as an upwardly inclined straight line and a downwardly inclined straight line, respectively, they may instead be formed as an upwardly inclined curve and a downwardly inclined curve, respectively. Furthermore, it is understood that the first and the second connecting rail parts 142c and 142d may be formed in shapes other than straight lines and inclined curves as well.

Preferably, but not necessarily, the guide protrusions 141 and the guide rails 142 as described above are respectively formed in four pairs on both sides of the cleaning member 130 corresponding to the light transmitting windows 121. It is understood that the cleaning member 130 may have more or less than four pairs of guide protrusions 141 and guide rails 142, and it is further understood that the guide protrusions 141 and guide rails 142 do not have to be formed on both sides of the cleaning member 130.

The guide unit 140 further includes a pressing unit 143 and a lifting unit 146, and guides a movement of the cleaning member 130. The pressing unit 143 pushes down the cleaning member 130, so that the cleaning member 130 moves along the downwardly inclined rail parts 142a at a starting position of the cleaning path. To accomplish this, the pressing unit 143 includes at least one pair of pressing protrusions 144 and at least one pair of pressing grooves 145.

The pressing protrusions 144 are disposed to be inclined at predetermined angles on both sides of the cleaning member 131. The pressing grooves 145 are formed on both sides of the cover 120 to accommodate the pressing protrusions 144. The pressing grooves 145 have inclined parts 145a disposed at inclined angles corresponding to the slant of the pressing protrusions 144.

According to the constructions described above and illustrated in FIG. 6A, as the pressing protrusions 144 are pressed downward by the inclined parts 145a, the guide protrusions 141 are moved downward along the downwardly inclined rail parts 142a. That is, due to a pressing force against the pressing protrusions 144, which are pressed by the inclined parts 145a, the guide protrusions 141 move down to the downwardly inclined rail part 142a, instead of accidentally moving up the second connecting rail part 142d.

The lifting unit 146 lifts up the cleaning member 130, so that the cleaning member 130 smoothly moves from an ending position of the cleaning path to a starting position of the returning path. To lift the cleaning member 130, the lifting unit 146 includes first and second inclined protrusions 147 and 148.

The first and the second inclined protrusions 147 and 148 are formed to have a predetermined slant on portions of the cleaning member 130 and the cover 120, which face each other. With the first and the second inclined protrusions 147 and 148, the guide protrusions 141 are guided from the downwardly inclined rail part 142a to the upwardly inclined rail part 142b.

To be more specific, as illustrated in FIG. 8B, as the first inclined protrusions 147 are guided along the second inclined protrusions 148, the guide protrusions 141 are lifted up and moved from the downwardly inclined rail part 142a to the upwardly inclined rail part 142b. For this, preferably, but not necessarily the first and the second inclined protrusions 147 and 148 are formed to have inclined angles which correspond to the slant of the upwardly inclined rail part 142b.

The second inclined protrusions 148 are movable into and out of a guide hole 148a, which is penetratingly formed in the plate 131. It should be noted that although the guide rails 142 and the pressing grooves 145 according to an embodiment of the present invention are illustrated as grooves formed to a predetermined depth in the cover 120, the guide rails 142 and pressing grooves 145 may instead be formed in other ways, such as penetrated holes, etc.

Hereinafter, a cleaning operation of the light transmitting windows of the laser scanning apparatus according to an embodiment of the present invention constructed as described above will now be described in details with reference to FIGS. 4, 5A, 5B, 6A, 6B, 7A, 7B, 8A and 8B.

As illustrated in FIG. 4, when the cam 151 is rotated in a direction of the arrow B (FIG. 4) to move the plate 131 in a direction of the arrow A1, the guide protrusions 141 are guided along the first and the second connecting rail parts 142c and 142d from the position illustrated in FIG. 5A to the position illustrated in FIG. 6A. With such a movement of the guide unit 140, the cleaning member 130 is moved from the position illustrated in FIG. 5B to the position illustrated in FIG. 6B. As illustrated in FIG. 5B, when the cleaning member 130 is not located on the cleaning path, paths of light beams L moving via the light transmitting windows 121 are opened by the slits 131a of the plate 131.

After being moved to the position illustrated in FIG. 5B, when the guide protrusions 141 are moved to a starting position of the downwardly inclined rail part 142a (that is, a starting position of the cleaning path), the plate 131 is moved in a direction indicated by the arrow A2 (FIG. 4) by a rotation of the cam 135. Thus, the guide protrusions 141 are guided along the downwardly inclined rail part 142a. At this time, as the pressing protrusions 144 formed on the plate 131 are pressed downward by the inclined parts 145a of the pressing grooves 145, the guide protrusions 141 are moved along the downwardly inclined rail part 142a. When the guide protrusions 141 move along the downwardly inclined rail part 142a, as illustrated in FIGS. 7A and 8A, the cleaning member 130 is also moved, so that the brushes 132 clean the light transmitting windows 121, as illustrated in FIGS. 7B and 8B.

After the cleaning operation of the brushes 132, the first inclined protrusions 147 are guided along the second inclined protrusions 148 to guide the upward movement of the plate 131. As the plate 131 moves upward, the brushes 132 smoothly move to a starting position of the returning path illustrated in FIGS. 5A and 5B via the dirt collecting parts 132. At this time, the collecting ribs 122a of the dirt collecting parts 122 separate and collect cleaned dust, dirt, and/or other particles from the brushes 132.

As is apparent from the foregoing description, according to an embodiment of the present invention, a laser scanning apparatus and the image forming device having the same are configured so that the cleaning member does not come in contact with the light transmitting windows when the cleaning member is returned after cleaning the light transmitting window, thereby preventing a secondary contamination of the light transmitting windows.

Also, according to an embodiment of the present invention, the laser scanning apparatus and the image forming device having the same and an image forming device having the same is configured so that the dirt cleaned by the cleaning member is collected through the dirt collecting parts, thereby improving cleaning efficiency of the cleaning member.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A laser scanning apparatus, comprising:
   a light emitting unit to emit a light;
   a cover connected to a laser scanning apparatus body, and having at least one light transmitting window through which the light passes;

a cleaning member reciprocally disposed on the cover to clean the light transmitting window when on a cleaning path; and a guide unit to guide a movement of the cleaning member, so that the cleaning path is other than a returning path of the cleaning member and have different up and down periods from each other.

2. The laser scanning apparatus according to claim 1, wherein the guide unit comprises:

at least one pair of guide protrusions formed on both sides of the cleaning member; and at least one pair of guide rails formed on both sides of the cover to accommodate the guide protrusions, each of the guide rails having a downwardly inclined rail part to guide the cleaning member along the cleaning path, and an upwardly inclined rail part to guide the cleaning member along the returning path.

3. The laser scanning apparatus according to claim 2, wherein each of the guide rails has a first connecting rail part and a second connecting rail part to connect the downwardly inclined rail part to the upwardly inclined rail part in a loop.

4. The laser scanning apparatus according to claim 2, wherein the guide unit further comprises:

a pressing unit to push down the cleaning member, so that the cleaning member moves along the downwardly inclined rail part at a starting position of the cleaning path; and a lifting unit to lift up the cleaning member, so that the cleaning member moves from an ending position of the cleaning path to a starting position of the returning path.

5. The laser scanning apparatus according to claim 4, wherein the pressing unit comprises:

at least one pair of pressing protrusions inclined at a predetermined angle and formed on both sides of the cleaning member; and at least one pair of pressing grooves formed on both sides of the cover to accommodate the pressing protrusions, and having inclined parts disposed at an inclined angle corresponding to the predetermined angle of the pressing protrusions.

6. The laser scanning apparatus according to claim 4, wherein the lifting unit comprises first and second inclined protrusions having a predetermined slant and which are respectively formed on the cleaning member and the cover to contact each other when the cleaning member moves along the cleaning path.

7. The laser scanning apparatus according to claim 2, further comprising a driving part to reciprocate the cleaning member.

8. The laser scanning apparatus of claim 7, wherein the driving part comprises a cam having a cam protrusion received at a cam opening, such that a circular rotation of the cam causes a reciprocal movement of the cleaning member.

9. The laser scanning apparatus according to claim 2, wherein the cleaning member comprises:

a plate; and at least one brush attached to an undersurface of the plate.

10. The laser scanning apparatus according to claim 9, wherein at least one collecting rib is disposed on the cover to remove particles off the at least one brush and to collect the particles.

11. The laser scanning apparatus according to claim 10, wherein the at least one collecting rib comprises three collecting sub-ribs having different heights from one another.

12. The laser scanning apparatus according to claim 9, wherein at least one slit is formed in the plate to selectively open a light path.

13. The laser scanning apparatus according to claim 1, wherein the at least one light transmitting window comprises four light transmitting windows on the cover through which four respective colors of light pass through, and the cleaning member includes four brushes to clean the four light transmitting windows.

14. The laser scanning apparatus according to claim 13, wherein the guide unit comprises:

four pairs of guide protrusions, each pair of which are formed on both sides of the cleaning member; and four pairs of guide rails, each pair of which are formed on both sides of the cover to accommodate each pair of the guide protrusions, each of the guide rails having a downwardly inclined rail part to guide the cleaning member along the cleaning path and an upwardly inclined rail part to guide the cleaning member along the returning path.

15. The laser scanning apparatus according to claim 14, wherein the guide unit further comprises:

a pressing unit to push down the cleaning member, so that the cleaning member moves along the downwardly inclined rail parts at a starting position of the cleaning path; and a lifting unit to lift up the cleaning member, so that the cleaning member moves from an ending position of the cleaning path to a starting position of the returning path.

16. The laser scanning apparatus according to claim 13, further comprising a driving part to reciprocate the cleaning member.

17. The laser scanning apparatus according to claim 16, wherein the driving part comprises:

a cam having a cam protrusion received at a cam opening, such that a circular rotation of the cam causes a reciprocal movement of the cleaning member.

18. The laser scanning apparatus according to claim 13, wherein four slits are formed in the cleaning member to selectively open paths for light beams emitted from the four corresponding light transmitting windows.

19. The laser scanning apparatus according to claim 13, wherein four dirt collecting parts are disposed adjacent to the four light transmitting windows on the cover to remove particles off the four brushes and to collect the particles.

20. The laser scanning apparatus according to claim 19, wherein each of the four dirt collecting parts comprises three collecting sub-ribs having different heights from one another.

21. An image forming device comprising:

a photoconductive medium; and a laser scanning apparatus to form an electrostatic latent image on the photoconductive medium by emitting a light beam, wherein the laser scanning apparatus comprises:

a cover connected to a laser scanning apparatus body, and having at least one light transmitting window through which the light beam passes to the photoconductive medium, a cleaning member reciprocally disposed on the cover to clean the light transmitting window when on a cleaning path, and a guide unit to guide a movement of the cleaning member, so that the cleaning path is other than a returning path of the cleaning member and have different up and down periods from each other.

22. A cleaning apparatus of a laser scanning apparatus comprising:

a cover connectable to the laser scanning apparatus, and having at least one light transmitting window through which light passes; and a cleaning member disposed on the cover to clean the light transmitting window by moving along a path in which the cleaning member contacts a surface of the light transmitting window while moving in a first direction, and does not contact the surface while moving in a second direction other than the first direction.

23. The cleaning apparatus according to claim 22, wherein the path comprises a cleaning path and a returning path which are formed on the cover at different heights from each other.

24. The cleaning apparatus according to claim 23, further comprising:

a guide unit to guide the cleaning member along the cleaning path and the returning path, comprising:

a guide protrusion, and a guide rail to accommodate the guide protrusion, wherein the guide rail has a downwardly inclined rail part to guide the cleaning member along the cleaning path, and an upwardly inclined rail part to guide the cleaning member along the returning path.

25. The cleaning apparatus according to claim 24, wherein the guide unit further comprises:

a pressing unit to push down the cleaning member, so that the cleaning member moves along the downwardly inclined rail part at a starting position of the cleaning path; and a lifting unit to lift up the cleaning member, so that the cleaning member moves from an ending position of the cleaning path to a starting position of the returning path.

26. The cleaning apparatus according to claim 24, wherein the guide rail has a first connecting rail part and a second connecting rail part to connect the downwardly inclined rail part to the upwardly inclined rail part in a loop.

27. The cleaning apparatus according to claim 26, wherein the pressing unit comprises:

a pressing protrusion inclined at a predetermined angle; and a pressing groove to accommodate the pressing protrusion, and having an inclined part disposed at an inclined angle corresponding to the predetermined angle of the pressing protrusion.

28. The cleaning apparatus according to claim 27, wherein the lifting unit comprises first and second inclined protrusions which are respectively formed on the cleaning member and the cover to contact each other when the cleaning member moves along the cleaning path.

29. The cleaning apparatus according to claim 22, further comprising a driving part to reciprocate the cleaning member.

30. The cleaning apparatus according to claim 29, wherein the driving part comprises a cam having a cam protrusion received at a cam opening such that a circular rotation of the cam causes a reciprocal movement of the cleaning member.

31. The cleaning apparatus according to claim 22, wherein the cleaning member comprises:

a plate; and at least one brush attached to an undersurface of the plate.

32. The cleaning apparatus according to claim 31, wherein at least one collecting rib is disposed on the cover to scrape particles off the at least one brush and to collect the particles.

33. The cleaning apparatus according to claim 31, wherein at least one slit is formed in the plate to selectively open a light path.

34. A method of cleaning a laser scanning apparatus, comprising:

moving a cleaning member in a first direction from a start position to contact a surface of a light transmitting window formed in a laser scanning apparatus body and remove particles off the surface; and moving the cleaning member in a second direction other than the first direction along a path in which the cleaning member does not contact the surface while moving in the second direction to the start position.

35. The method according to claim 34, wherein the path comprises a cleaning path and a returning path which are at different heights from each other.

* * * * *